United States Patent [19]
Nakarai

[11] 4,204,215
[45] May 20, 1980

[54] INK JET SYSTEM FOR ISSUING INK UNDER A PREDETERMINED UNIFORM PRESSURE IN AN INK JET SYSTEM PRINTER

[75] Inventor: Masazumi Nakarai, Kyoto, Japan

[73] Assignee: Sharp Kabushiki Kaisha, Japan

[21] Appl. No.: 860,959

[22] Filed: Dec. 15, 1977

[30] Foreign Application Priority Data

Dec. 17, 1976 [JP] Japan .................. 51-154769

[51] Int. Cl.$^2$ .................. G01D 15/18
[52] U.S. Cl. .................. 346/140 R
[58] Field of Search .................. 346/75, 140 R

[56] References Cited

U.S. PATENT DOCUMENTS

| 3,761,953 | 9/1973 | Helgeson et al. | 346/75 |
| 3,930,258 | 12/1975 | Dick et al. | 346/140 R X |

Primary Examiner—George H. Miller, Jr.
Attorney, Agent, or Firm—Birch, Stewart, Kolasch & Birch

[57] ABSTRACT

An ink liquid supply system for issuing ink from a nozzle under a predetermined uniform pressure in an ink jet system printer. The ink liquid supply system mainly comprises a gas pressure control means for generating a gas pressure of a predetermined uniform value, and a pressure chamber for applying the thus generated uniform gas pressure to the ink to be supplied to the nozzle.

11 Claims, 5 Drawing Figures

INK JET SYSTEM FOR ISSUING INK UNDER A PREDETERMINED UNIFORM PRESSURE IN AN INK JET SYSTEM PRINTER

BACKGROUND OF THE INVENTION

The present invention relates to a liquid jet system for issuing liquid under a predetermined uniform pressure and, more particularly, to an ink liquid supply system for an ink jet system printer.

Generally, a conventional ink liquid supply system for an ink jet system printer, such as disclosed in U.S. Pat. No. 4,007,684 entitled "INK LIQUID WARMER FOR INK JET SYSTEM PRINTER" issued on Feb. 15, 1977, mainly comprises a pump for supplying the ink liquid to a nozzle under a predetermined pressure. Therefore, a pressure pulsation is inevitably created, and the system requires a preparation period of a considerably long period of time during which the ink liquid pressure is gradually increased to a predetermined value.

To avoid the above-mentioned defects, an air chamber is disposed within the ink liquid supply system. However, the pump and the air chamber occupy a large area and, therefore, the conventional ink liquid supply system is considerably large.

OBJECTS AND SUMMARY OF THE INVENTION

Accordingly, an object of the present invention is to provide an ink jet system which can issue ink from a nozzle under a predetermined uniform pressure.

Another object of the present invention is to provide an ink liquid supply system for an ink jet system printer, which requires a preparation period of the minimum length.

Still another object of the present invention is to provide an ink jet system of a compact size.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

To achieve the above objects, pursuant to an embodiment of the present invention, a gas pressure control means is provided for generating a gas pressure of a predetermined uniform value through the use of a gas bomb connected to the gas pressure control means. The thus generated uniform gas pressure is introduced into a pressure chamber which functions to apply the uniform gas pressure to ink liquid to be supplied to a nozzle. In a preferred form, the pressure chamber includes a flexible film or a bellows which functions as a partition membrane between the gas and the ink liquid and through which the predetermined uniform gas pressure generated by the gas pressure control means is applied to the ink liquid to be supplied to the nozzle. An electromagnetic cross valve is disposed between the pressure chamber and the nozzle to control the issuance of the ink liquid from the nozzle.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DESCRIPTION OF THE PREFERRED EMBODIMENTS

Figure 1:
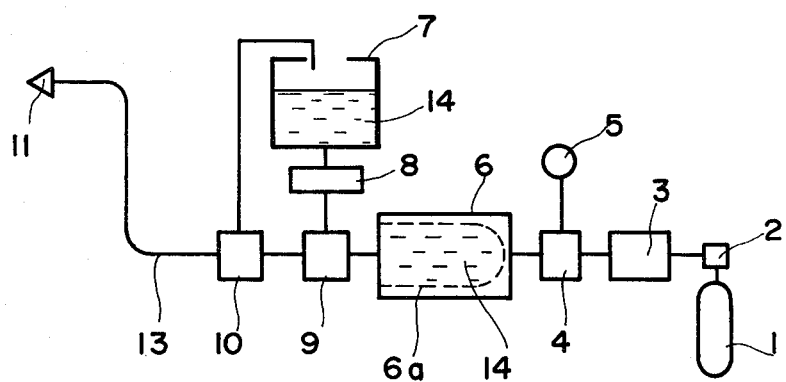
FIG. 1 is a schematic diagram of an embodiment of an ink jet system of the present invention.

FIG. 1 shows an embodiment of an ink jet system of the present invention.

The ink jet system mainly comprises a gas bomb 1, a gas pressure controller 3, a pressure chamber 6 and a nozzle 11. The gas bomb 1 is filled with compressed gas consisting of, for example, $CO_2$, $N_2$ or air. The gas bomb 1 is removably secured to the ink jet system through a cap opener 2 which functions to open a cap of the gas bomb 1 when the gas bomb 1 is secured to the cap opener 2. The gas bomb 1 develops high pressure gas of, for example, 60 Kg/cm$^2$ at room temperature when $CO_2$ gas is utilized. The gas pressure controller 3 receives the high pressure gas from the gas bomb 1 and functions to generate a preferred uniform gas pressure of, for example, 3 Kg/cm$^2$.

An electromagnetic cross valve 4 is disposed between the gas pressure controller 3 and the pressure chamber 6. The electromagnetic cross valve 4 functions to selectively connect the pressure chamber 6 to the gas pressure controller 3 or to a suction means 5 or to the atmosphere.

More specifically, when the electromagnetic cross valve 4 is actuated, the pressure chamber 6 is communicated to the gas pressure controller 3, whereby the uniform gas pressure generated from the gas pressure controller 3 is applied to the pressure chamber 6. Contrarily, when the electromagnetic cross valve 4 is deactivated, the pressure chamber 6 is communicated to the suction means 5 or to the atmosphere in order to reduce the gas pressure in the pressure chamber 6.

The pressure chamber 6 functions to apply the uniform gas pressure generated from the gas pressure controller 3 to the ink liquid 14 to be supplied to the nozzle 11. An ink tank 7 is provided for supplying the ink liquid 14 to the pressure chamber 6 through a filter 8 and a 2-way valve 9.

The 2-way valve 9 mainly comprises two check valves, one allowing the flow of the ink liquid from the pressure chamber 6 toward the nozzle 11 and the other allowing the flow of the ink liquid from the ink tank 7 to the pressure chamber 6.

More specifically, when the ink liquid 14 contained in the pressure chamber 6 receives the uniform gas pressure generated from the gas pressure controller 3, the 2-way valve 9 functions to communicate the pressure chamber 6 to the nozzle 11. When the ink liquid 14 contained in the pressure chamber 6 does not receive the uniform gas pressure generated from the gas pressure controller 3, the 2-way valve 9 functions to communicate the pressure chamber 6 to the ink tank 7. A preferred 2-way valve is a "2-way vacuum valve, XKEM 001 04" manufactured by Millipore Corporation, U.S.A.

An electromagnetic cross valve 10 is disposed between the 2-way valve 9 and the nozzle 11 for controlling the supply direction of the ink liquid 14. The electromagnetic cross valve 10 is provided for achieving sudden termination and initiation of the ink issuing from the nozzle 11. The ink liquid 14 is supplied from the pressure chamber 6 to the nozzle 11 through a conduit 13 when the system is in an operative condition, and the ink liquid 14 is returned from the nozzle 11 and supplied to the ink tank 7 when the system ceases its operation.

For example, the coil of the electromagnetic cross valve 10 is activated in order to connect the nozzle 11 with the pressure chamber 6 when the system is in an operative condition. However, when the coil of the electromagnetic cross valve 10 is deactivated, the nozzle 11 is connected with the ink tank 7 and to the atmospheric pressure.

The electromagnetic cross valve 10 may be omitted from the system when the sudden termination of the ink issuing from the nozzle 11 is not required. In such a case, the control of the ink issuing from the nozzle 11 is achieved by the electromagnetic cross valve 4.

Figure 2:
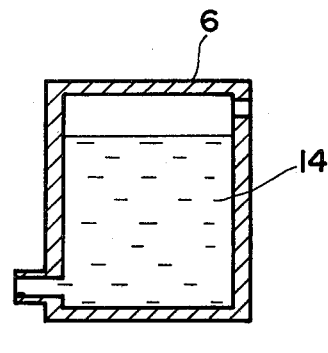
FIG. 2 is a sectional view of an embodiment of a pressure chamber included within the ink jet system of FIG. 1.
Figure 3:
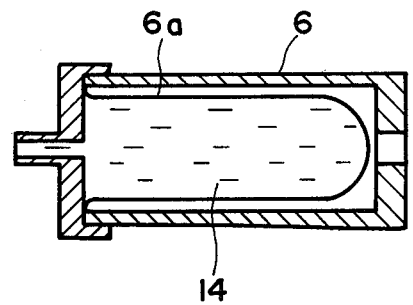
FIG. 3 is a sectional view of another embodiment of a pressure chamber included within the ink jet system of FIG. 1.
Figure 4:
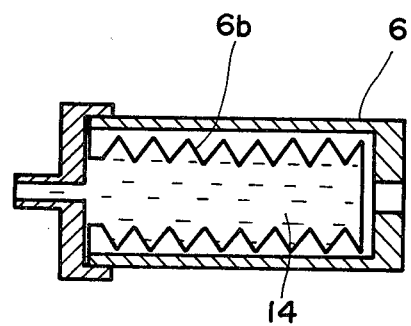
FIG. 4 is a sectional view of still another embodiment of a pressure chamber included within the ink jet system of FIG. 1.

FIGS. 2 through 4 show examples of the pressure chamber 6.

The pressure chamber 6 mainly comprises a solid housing for containing the ink liquid 14 therein and for introducing the uniform gas pressure generated from the gas pressure controller 3. In the example of FIG. 2, the gas introduced from the gas pressure controller 3 is held in contact with the ink liquid 14. However, in the example of FIG. 2, there is a possibility that the gas is mixed with the ink liquid 14. This is not preferable for an ink jet system printer.

In the example of FIG. 3, a partition membrane 6a made of a flexible film such as a thin rubber film or a thin plastic film is disposed within the solid housing in order not to hold the ink liquid 14 contact with the gas introduced from the gas pressure controller 3. The uniform gas pressure generated from the gas pressure controller 3 is applied to the ink liquid through the partition membrane 6a.

In the example of FIG. 4, a bellows 6b is disposed within the solid housing to separate the gas from the ink liquid 14. A diaphragm can be employed instead of the bellows 6b. The uniform gas pressure generated from the gas pressure controller 3 is applied to the ink liquid 14 through the bellows 6b. When the application of the uniform gas pressure from the gas pressure controller 3 is removed, the bellows 6b returns to its initial state to introduce the ink liquid 14 from the ink tank 7 into the pressure chamber 6.

Figure 5:
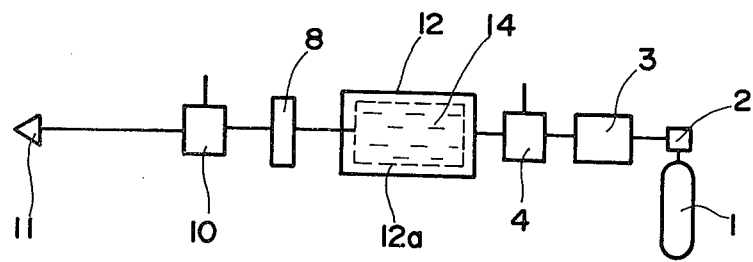
FIG. 5 is a schematic diagram of another embodiment of an ink jet system of the present invention.

FIG. 5 shows another embodiment of an ink jet system of the present invention, wherein the ink tank 7 for supplementing the ink liquid is omitted. Like elements corresponding to those of FIG. 1 are indicated by like numerals.

The system of FIG. 5 mainly comprises a pressure chamber 12 of the ink cartridge type. The pressure chamber 12 comprises a solid housing and an ink cartridge 12a made of a flexible film such as a rubber film or a plastic film. The ink cartridge 12a is detachable from the system.

In the embodiment of FIG. 5, the gas pressure from the gas bomb 1 is transferred to the electromagnetic cross valve 4 through the gas pressure controller 3 when the system is not in the operative condition. When the electromagnetic cross valve 4 is energized, the uniform gas pressure generated from the gas pressure controller 3 is applied to the ink liquid 14 contained in the ink cartridge 12a. Therefore, when the electromagnetic cross valve 10 is energized, the ink liquid is supplied to the nozzle 11 under a predetermined uniform pressure, whereby the ink liquid is issued from the nozzle 11. When the electromagnetic cross valve 10 is deactuated, the ink liquid pressure between the electromagnetic cross valve 10 and the nozzle 11 is reduced to the atmospheric pressure and, therefore, the ink issuing from the nozzle 11 is suddenly terminated. Thereafter, when the electromagnetic cross valve 4 is deactuated, the gas contained in the pressure chamber 12 is discharged to the atmosphere in order to reduce the gas pressure applied to the pressure chamber 12.

When the ink liquid 14 contained in the ink cartridge 12a is exhausted, the ink cartridge 12a is exchanged when the electromagnetic cross valve 4 is deactuated. The electromagnetic cross valve 4 can be omitted when the amount of the ink liquid contained in the ink cartridge 12a is identical with that of the gas contained in the gas bomb 1.

The invention being thus described, it will be obvious that the same may be varied in many ways. Such variations are not to be regarded as a departure from the spirit and scope of the invention, and all such modifications are intended to be included within the scope of the following claims.

What is claimed is:

1. An ink source device for an ink jet system including a nozzle for emitting ink liquid therefrom, said ink source device comprising:
   a primary static pressure chamber for containing an ink liquid therein;
   a gas pressure control means for generating a gas pressure of a predetermined fixed value;
   said gas pressure control means being operatively connected to the primary static pressure chamber, and said primary pressure chamber being responsive to the predetermined fixed gas pressure generated from said gas pressure control means, thereby applying said predetermined fixed gas pressure to said ink liquid contained in the pressure chamber as its initial supply pressure; and
   means for connecting said primary pressure chamber to said nozzle for supplying said ink liquid of said predetermined fixed gas pressure to said nozzle.

2. The ink source device of claim 1, which further comprises a gas bomb connected to said gas pressure control means for supplying said gas pressure control means with gas of a predetermined pressure.

3. The ink source device of claim 2, wherein said gas bomb is detachable from the system.

4. The ink source device of claim 1, wherein the pressure chamber comprises a partition means for separating the ink liquid from the gas introduced from said gas pressure control means, said predetermined uniform gas pressure being applied to said ink liquid through the partition means.

5. The ink source device of claim 4, wherein said partition means is a flexible film.

6. The ink source device of claim 4, wherein said partition means is a bellows.

7. The ink source device of claim 1, which further comprises a gas pressure application control means disposed between said gas pressure control means and said pressure chamber for selectively applying said predetermined uniform gas pressure generated from said gas pressure control means to said pressure chamber.

8. The ink source device of claim 7, wherein said gas pressure application control means is an electromagnetic cross valve which functions to apply said predetermined uniform gas pressure generated from said gas pressure control means to said pressure chamber when the electromagnetic cross valve is energized, and to hold the gas pressure in said pressure chamber at the atmospheric pressure when the electromagnetic cross valve is deactuated.

9. The ink source device of claim 8, which further comprises an ink liquid reservoir connected to said pressure chamber, and a control means for introducing the ink liquid from said ink liquid reservoir to said pressure chamber when said electromagnetic cross valve is deactuated.

10. The ink source device of claim 9, wherein said control means is a two-way valve disposed between said pressure chamber and said nozzle, and between said ink liquid reservoir and said pressure chamber, said two-way valve allowing the flow of the ink liquid either from said pressure chamber to said nozzle or from said ink liquid reservoir to said pressure chamber.

11. The ink source device of claim 10, wherein a valve means is disposed between said two-way valve and said nozzle for controlling the issuance of the ink liquid from said nozzle.

* * * * *